United States Patent
Bartram et al.

(10) Patent No.: US 11,546,422 B2
(45) Date of Patent: Jan. 3, 2023

(54) DYNAMIC MANAGEMENT OF LOCATIONS OF MODULES OF A PLATFORM HOSTED BY A DISTRIBUTED SYSTEM

(71) Applicant: Capital One Services, LLC, McLean, VA (US)

(72) Inventors: Christian Bartram, Orlando, FL (US); Connor Cason, Vienna, VA (US); Noriaki Tatsumi, Silver Spring, MD (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/248,098

(22) Filed: Jan. 8, 2021

(65) Prior Publication Data

US 2022/0224753 A1 Jul. 14, 2022

(51) Int. Cl.
*H04L 67/1029* (2022.01)
*H04L 67/1008* (2022.01)
*G06F 11/34* (2006.01)
*G06F 11/30* (2006.01)
*H04L 67/1012* (2022.01)

(52) U.S. Cl.
CPC ...... *H04L 67/1029* (2013.01); *G06F 11/3006* (2013.01); *G06F 11/3433* (2013.01); *H04L 67/1008* (2013.01); *H04L 67/1012* (2013.01)

(58) Field of Classification Search
None
See application file for complete search history.

(56) References Cited

U.S. PATENT DOCUMENTS

| | | | |
|---|---|---|---|
| 6,898,564 B1 | 5/2005 | Odhner et al. | |
| 7,496,667 B2 | 2/2009 | Adam et al. | |
| 7,788,671 B2 | 8/2010 | Black-Ziegelbein et al. | |
| 7,865,582 B2 | 1/2011 | Santos et al. | |
| 8,140,523 B2 | 3/2012 | Fakhouri et al. | |
| 8,230,438 B2 | 7/2012 | Kimbrel et al. | |
| 8,321,558 B1 | 11/2012 | Sirota et al. | |
| 8,464,217 B2 | 6/2013 | Janczewski | |

(Continued)

OTHER PUBLICATIONS

Beloglazov et al., "Optimal Online Deterministic Algorithms and Adaptive Heuristics for Energy and Performance Efficient Dynamic Consolidation of Virtual Machines in Cloud Data Centers," Concurrency and Computation: Practice and Experience, vol. 24, 2012, pp. 1397-1420.

*Primary Examiner* — Anh Nguyen
(74) *Attorney, Agent, or Firm* — Harrity & Harrity, LLP

(57) ABSTRACT

In some implementations, a system may monitor session data associated with a first module and a second module of a platform. The system may determine a rate of communication between the first module and the second module based on the session data. The system may determine, using an optimization model, a co-location score associated with the first module and the second module based on the rate of communication, wherein the co-location score indicates an impact of co-location of the first module and the second module. The system may determine that the co-location score satisfies a co-location score threshold associated with an improvement to an operation of the platform. The system may perform an action associated with co-locating the first module and the second module.

20 Claims, 11 Drawing Sheets

(56) References Cited

U.S. PATENT DOCUMENTS

| | | | |
|---|---|---|---|
| 2015/0134779 A1* | 5/2015 | Thompson | H04L 67/101 |
| | | | 709/219 |
| 2016/0188594 A1 | 6/2016 | Ranganathan | |
| 2017/0052707 A1 | 2/2017 | Koppolu et al. | |
| 2017/0086325 A1* | 3/2017 | Connor | H05K 7/1489 |
| 2019/0332443 A1 | 10/2019 | Kelly | |
| 2019/0384649 A1 | 12/2019 | Wen et al. | |
| 2021/0042292 A1* | 2/2021 | Gentric | G06F 9/30036 |

* cited by examiner

DYNAMIC MANAGEMENT OF LOCATIONS OF MODULES OF A PLATFORM HOSTED BY A DISTRIBUTED SYSTEM

BACKGROUND

A datacenter hosts multiple computing systems, such as server devices. A group of the computing systems can be housed and/or managed as a rack. A computing system can coordinate with another computing system to perform one or more operations of a cloud-based platform or distributed platform. For example, a distributed system may include multiple computing systems on a same rack of a datacenter, on separate racks of a datacenter, and/or within separate datacenters.

SUMMARY

In some implementations, a device for dynamically managing locations of modules of a distributed host system includes one or more memories; and one or more processors, communicatively coupled to the one or more memories, configured to: receive a request to host a platform that includes a first module and a second module; configure the first module to operate on a first server of a first server rack that is located at a first physical location; configure the second module to operate on a second server of a second server rack that is located at a second physical location; monitor a first utilization of the first server rack and a second utilization of the second server rack; determine a rate of communication between the first module and the second module based on session data associated with an operation of the platform; determine, using an optimization model, a co-location score associated with the first module and the second module based on the rate of communication, the first utilization and the second utilization, wherein the co-location score is indicative of whether co-location of the first module and the second module is optimal for the operation according to the optimization model; determine that the co-location score indicates, according to the optimization model, that co-location of the first module and the second module is optimal for the operation; and perform an action associated with relocating the first module toward the second physical location or relocating the second module toward the first physical location.

In some implementations, a method for dynamically managing locations of modules of a distributed host system includes monitoring session data associated with a first module and a second module of a platform, wherein the session data is associated with an operation of the platform that involves coordination between first module and the second module, and wherein the first module is hosted on a first server of a first server rack and the second module is hosted on a second server of a second server rack; determining a rate of communication between the first module and the second module based on the session data; determining, using an optimization model, a co-location score associated with the first module and the second module based on the rate of communication, wherein the co-location score indicates an impact of co-location of the first module and the second module; determining that the co-location score satisfies a co-location score threshold associated with an improvement to the operation; determining a first utilization of the first server rack and a second utilization of the second server rack; selecting, based on the first utilization and the second utilization, the first module for relocation; and performing an action associated with relocating the first module to a server rack that is physically located nearer to the second server rack than the first server rack.

In some implementations, a non-transitory computer-readable medium storing a set of instructions includes one or more instructions that, when executed by one or more processors of a device, cause the device to: obtain network flow data associated with communications, via a network, between modules of an application platform that is hosted by a distributed host system; obtain, from a first orchestration client, first rack status data associated with a first server rack, wherein the first server rack includes a first server that is hosting a first module of an application platform; obtain, from a second orchestration client, second rack status data associated with a second server rack, wherein the second server rack includes a second server that is hosting a second module of the application platform; determine, based on the network flow data, a rate of communication between the first module and the second module based on session data associated with a subset of the communications; determine, using an optimization model, that the first module is to be relocated from the first server rack, wherein the optimization model comprises a machine learning model that is trained according to historical data associated with optimizing a performance characteristic of one or more other application platforms based on historical rack statuses and historical rates of communication between modules within one or more application platforms; and perform an action associated with relocating the first module to a third server to improve the performance characteristic of the application platform, wherein the action is performed based on at least one of the first rack status data, the second rack status data, or the rate of communication.

DETAILED DESCRIPTION

Figure 1A:
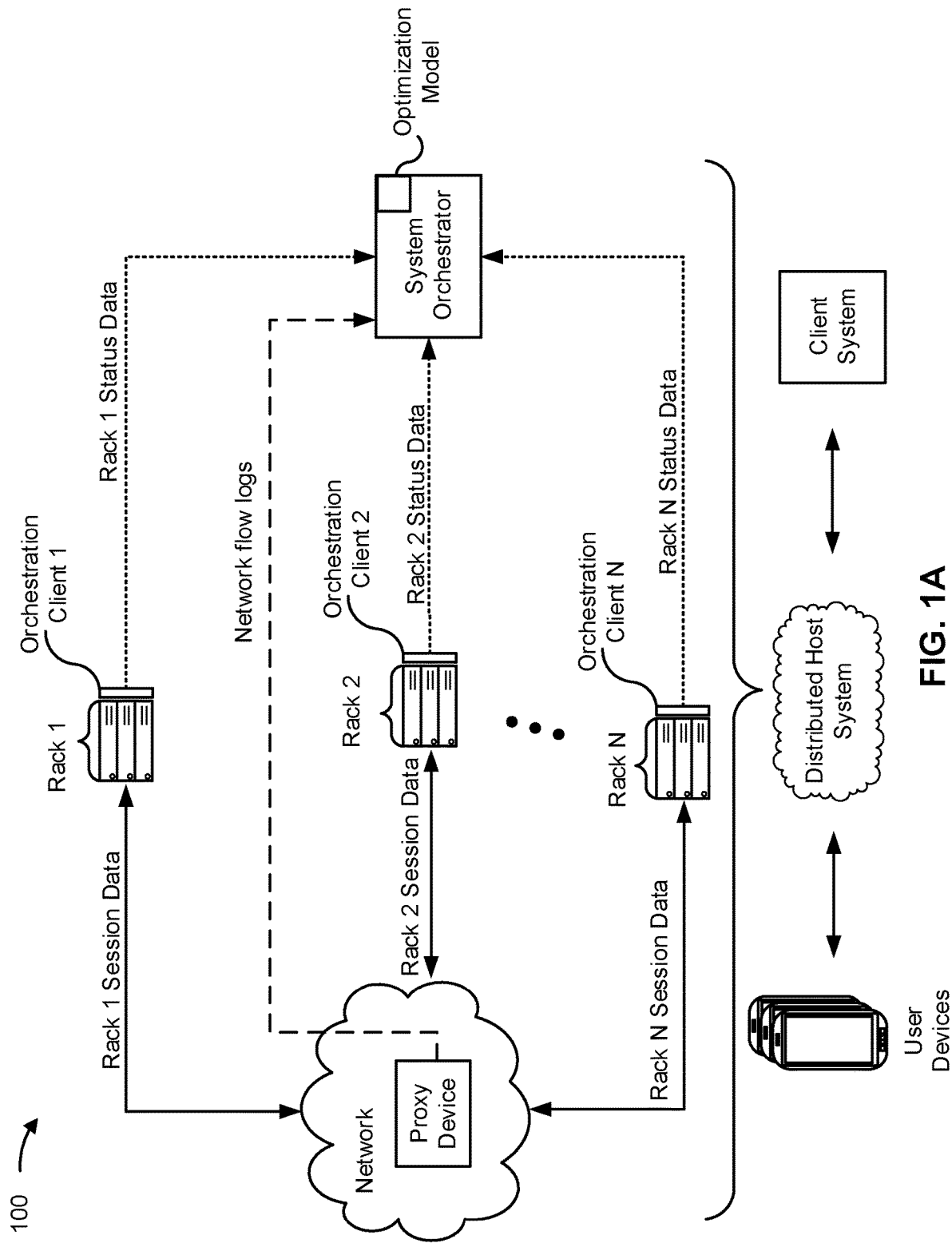
FIGS. 1A-1F are diagrams of an example implementation relating to dynamically managing locations of modules of a platform hosted by a distributed system.

The following detailed description of example implementations refers to the accompanying drawings. The same reference numbers in different drawings may identify the same or similar elements.

A distributed host system may host a plurality of separate modules (e.g., virtual components) of a platform on separate servers to perform one or more operations of the platform. For example, the separate servers may be configured to instantiate computing resources (e.g., processing resources and/or memory resources) to host the separate modules based on availability of resources of the distributed host system when onboarding the platform and/or while hosting the platform. However, relatively longer physical distances between modules hosted on separate servers can inherently degrade performance of the platform because the relatively longer physical distances result in increased latency of an operation involving the modules. On the other hand, hosting a platform entirely via a single system (e.g., via a single datacenter, a rack of servers, and/or a single server) may not be possible due to limited availability of resources. Further, hosting a platform entirely via a single system can degrade service in the event of a service outage of the single datacenter, the rack of servers, or the single server. Typically, load balancing techniques can be configured to ensure reliability of the platform. However, such load balancing techniques typically employ fixed thresholds for migrating modules to other servers, and, therefore, are not configured to dynamically improve performance of individual operations of the platform (e.g., by reducing latency of communications between modules of the platform) while maintaining reliability of the platform as a whole.

Some implementations described herein enable a distributed host system to improve performance of an operation of a platform hosted by the distributed host system by reducing latency of communications between modules used to perform the operation. For example, a system orchestrator of the distributed host system, as described herein, may monitor communications between modules of the platform that are hosted in separate geographical locations. The system orchestrator may receive characteristics of the communications from a flow proxy device of a network that communicatively couples the modules and/or from orchestration clients configured on individual server racks that are hosting the modules. The system orchestrator may determine, based on the characteristics of the communications (e.g., quantity of communications, quantity of data communicated, and/or frequency of communications) and utilizations of server racks hosting the modules, whether a physical distance between the modules should be reduced and/or whether the modules should be co-located on a same server rack (e.g., based on the utilizations of the server racks). Based on a determination that the physical distance is to be reduced and/or that the modules are to be co-located, the system orchestrator may cause one or more of the modules to be relocated to reduce the latency of communications between the modules.

In some implementations, the system may facilitate co-location and/or relocation of a module without interrupting a service associated with the module. For example, as described herein, the system may test relocation of a module at a selected server to verify that the selected server is capable of hosting the module. More specifically, the system may incrementally reassign tasks to a copy of the module that is instantiated on the selected server until the selected server is verified as capable of hosting the module without interrupting the service. Therefore, the system is capable of providing co-location and/or relocation of module without interrupting or delaying performance of tasks, workflows, and/or requests associated with the module.

Accordingly, as described herein the system orchestrator may improve performance of operations of the modules hosted by a distributed host system, thereby permitting the servers of the distributed host system to operate more efficiently. For example, by reducing latency of communications between modules, the system orchestrator may permit the servers to perform more operations during a given time period than a distributed host system that is not configured with a system orchestrator as described herein.

Furthermore, computing resources (e.g., processor resources and/or memory resources) of servers hosting the modules may be conserved by preventing wasted consumption of computing resources on performing or attempting to perform operations that ultimately fail due to latency issues.

Moreover, the system orchestrator, based on utilizations of servers of server racks, may reduce consumption of power resources of the distributed host system by migrating modules hosted on servers of a server rack that is indicated (e.g., by an orchestration client of the server rack) to have relatively low utilization (e.g., to reduce a quantity of modules or remove modules from the server rack). Further, in such a case, the system orchestrator may conserve overall power consumption of the distributed host system because the system orchestrator may cause power to the server rack to be reduced and/or removed, while the other servers that host the migrated modules may consume relatively fewer power resources because the other servers are actively hosting other resources.

FIGS. 1A-1F are diagrams of an example implementation 100 associated with dynamic management of locations of modules of a platform hosted by a distributed system. As shown in FIGS. 1A-1F, example implementation 100 includes a distributed host system, one or more user devices, and a client system. Further, the distributed host system includes a system orchestrator with an optimization model, N server racks (shown as Rack 1 to Rack N), N orchestration clients (shown as Orchestration Client 1 to Orchestration Client N), and a proxy device within a network. As described herein, a server rack includes a group of servers that are co-located (e.g., on a same chassis and/or within a same room) of a datacenter. The devices of example implementation 100 are described in more detail below in connection with FIG. 4 and FIG. 5.

In example implementation 100, the client system may provision the distributed host system to host a platform (e.g., via a host request). The platform may be an application platform and/or a service platform that provides one or more services of the client system. The one or more services may be provided via various operations of the platform. An operation of the platform may be performed by an individual module and/or may involve coordination between multiple modules. For example, to engage in a transaction (e.g., a data transaction, a service transaction, a financial transaction, and/or a security transaction), a first module may authenticate a user involved in the transaction, and a second module of the platform may execute the transaction. As described herein, a module may include at least one of a function (e.g., a lambda function or other type of anonymous function), an application programming interface (API), a virtual machine, a container, or any other type of virtual component. The distributed host system may host multiple platforms for a same client system and/or multiple platforms for multiple different client systems.

As shown in FIG. 1A, the system orchestrator may be configured within the distributed host system to receive status data from the orchestration clients to monitor statuses of servers that are hosting modules of a platform hosted by the distributed host system. As described elsewhere herein, one or more of the orchestration clients (e.g., each of the orchestration clients) are configured to monitor statuses (e.g., utilization, performance characteristics and/or health) of servers on respective server racks associated with the individual orchestration clients and/or statuses of the respective server racks as a group (e.g., rack level utilization, rack level performance, and/or rack level health). For example, the individual servers may include one or more monitoring agents that are configured to receive instructions associated with measuring and/or determining statuses associated with the respective servers and report and/or provide the statuses to the corresponding orchestration clients and/or the system orchestrator.

As further shown in FIG. 1A, session data (e.g., involving user sessions by the user devices) may be exchanged between servers of the server racks via the network. The proxy device may maintain traffic flow information and/or network flow data associated with the session data in network flow logs of the distributed host system. The system orchestrator may be configured within the distributed host system to receive the network flow logs from the proxy device to monitor communications between modules of the platform and/or between server racks of the distributed host system. For example, within the network flow logs, the proxy device may identify records of communications between servers and/or server racks (e.g., based on source addresses and destination addresses of the traffic). The system orchestrator, as described elsewhere herein, may infer from the network flow logs that the communications are between modules of the platform that are hosted on the identified servers and/or the identified server racks.

In some implementations, the proxy device may provide network flow data that identifies a utilization of one or more network devices of the network. For example, the network flow data may indicate utilization of one or more gateways to the network, such as gateways that are communicatively coupled to (e.g., used as ingress/egress nodes of the network by) the server racks. In such cases, the utilization may be representative of levels of congestion of the network at various locations of the network. In some implementations, the system orchestrator may consider the network flow data (and/or utilization of network devices in the network) to determine whether one or more modules are to be relocated (e.g., to avoid congestion, minimize congestion, minimize latency, and/or increase a data rate of the network).

The proxy device may provide the network flow logs and/or network flow data periodically and/or according to a schedule (e.g., for batch processing). Additionally, or alternatively, the proxy device may provide the network flow logs based on detecting a particular event (e.g., detecting a threshold quantity of communications between servers within a particular time period).

The server racks in example implementation 100 may be geographically (and/or physically) separated from one another. For example, Rack 1 may be in a first datacenter, and Rack 2 may be in a second datacenter that is remotely located from the first datacenter. More specifically, Rack 1 and Rack 2 maybe located in different buildings, on separate campuses, in different jurisdictions (e.g., in different cities, different states, and/or different countries), and/or in different regions of the world (e.g., on separate continents). Correspondingly, modules of the platform may be geographically remote from one another, such that the physical distance between the modules may cause latency to exceed a threshold (e.g., a latency threshold of a service level agreement involving the distributed host system hosting the platform for the client system).

Furthermore, certain modules of the platform may be geographically further from one or more of the user devices, which may be associated with end users of the platform, than other modules of the platform. For example, the end users may have an account associated with the client system and/or be subscribers of one or more services provided by the platform. In some implementations, more user devices may be located in certain geographical areas (e.g., campuses, jurisdictions, and/or geographical regions) than other geographical areas. In such cases, the modules of the platform that are relatively further from geographical areas with a higher concentration of the user devices (and/or end users) may cause a relatively greater degradation of performance of operations of the platform relative to the user devices were being relatively equally geographically distributed or closer because the modules are located relatively further from these geographical areas and are relatively concentrated.

As described elsewhere herein, in example implementation 100, the system orchestrator may utilize the optimization model to determine whether modules of the distributed host system should be co-located to improve performance of the platform (e.g., by improving performance of an operation involving the modules). The optimization model may involve one or more artificial intelligence techniques, such as machine learning and/or deep learning, to dynamically manage locations of modules of the platform to optimize (e.g., according to a configuration of the optimization model) the performance of the platform.

Figure 1B:
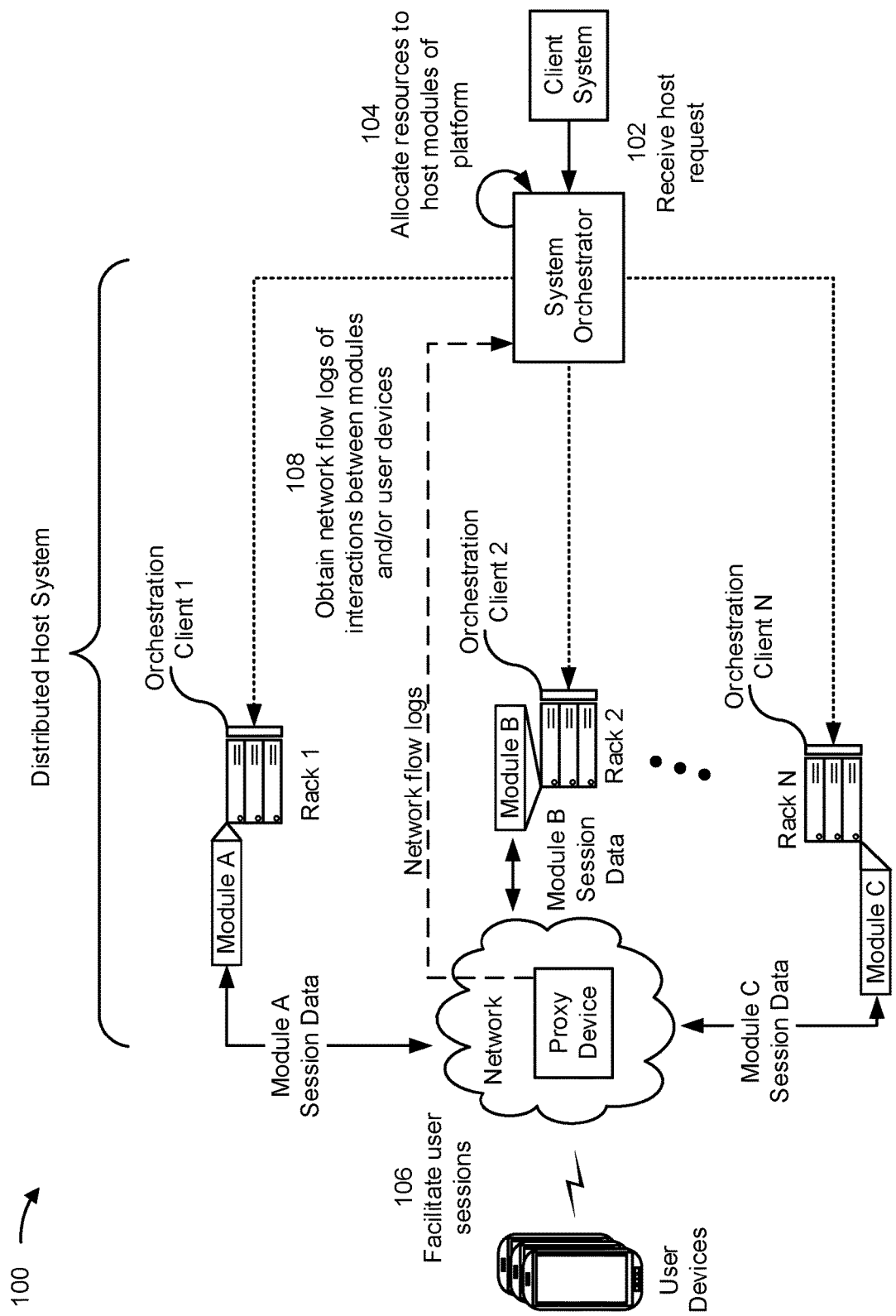

As shown in FIG. 1B, and by reference number 102, the system orchestrator receives a host request from the client system. For example, the client system may engage with a service provider of the distributed host system to request that the service provider host a platform via the distributed host system. The host request may correspond to a service level agreement that is agreed upon by the service provider and the client system. The service level agreement may include and/or identify certain service level thresholds of performance characteristics (e.g., minimum or maximum performance requirements) of the platform and/or of one or more modules of the platform. Accordingly, as described herein, the system orchestrator may dynamically manage locations of modules of the platform to abide by the performance requirements and/or service thresholds.

As further shown in FIG. 1B, and by reference number 104, the system orchestrator allocates resources of the distributed host system to host one or more modules of the platform. For example, based on receiving the host request, the system orchestrator may instantiate resources of servers of the server racks to host individual modules of the platform using any suitable technique. The system orchestrator may utilize a load balancing technique that instantiates resources of servers (e.g., as virtual machines or other virtual components) to host individual modules of the platform based on characteristics (e.g., data size and/or type) of the modules, based on performance requirements of the modules, based on resource availability of the servers of the server racks, and/or based on performance capabilities of the servers of the server racks.

Accordingly, the system orchestrator may distribute modules of the platform to various locations of the server racks, causing one or more sets of modules to be geographically (and/or physically) remote from one another. For example, as shown in the example of FIG. 1B, the system orchestrator may configure Module A to operate on Rack 1 and/or be located on Rack 1 (e.g., hosted by a server of Rack 1), may configure Module B to operate on Rack 2 and/or be located on Rack 2, and may configure Module C to operate on Rack N and/or be located on Rack N. Correspondingly, a greater physical distance between Rack 1 and Rack 2, and correspondingly between Module A and Module B, may inherently reduce performance of an operation involving usage of Module A and Module B (e.g., an operation performed by a coordination between Module A and Module B).

As further shown in FIG. 1B, and by reference number 106, the distributed host system facilitates user sessions between the user devices and the platform. The user sessions may involve the distributed host system receiving inputs (e.g., from the user devices and/or the client system) causing the servers to process the inputs and/or inputs from the client system via the modules of the platform and/or providing corresponding outputs to the user devices and/or the client system. Session data for the user sessions is communicated between the modules to perform one or more operations of the platforms.

As shown in the example of FIG. 1B, session data associated with Module A is communicated between Rack 1 and the network (e.g., to Module B, to Module C, and/or to other modules of the platform), session data associated with Module B is communicated between Rack 2 and the network (e.g., to Module A, to Module C, and/or to other modules of the platform), and session data associated with Module C is communicated between Rack N and the network (e.g., to Module A, to Module B, and/or to other modules of the platform).

As further shown in FIG. 1B, and by reference number 108, the system orchestrator obtains network flow logs of interactions between the modules and/or the user devices. For example, the system orchestrator may receive the network flow logs from the proxy device to monitor communications and/or interactions between the modules of the platform, communications and/or interactions between the user devices and the platform, and/or communications and/or interactions between the client system and the platform. The network flow logs may include and/or identify traffic flow information between Module A, Module B, Module C, and/or other modules of the platform as described elsewhere herein. As described herein, using the network flow logs, the system orchestrator may identify modules that should be co-located to improve performance of an operation of the platform by reducing latency of communications between the modules.

The proxy device may provide the network flow logs periodically (e.g., according to a fixed period of time, such as every two seconds, every five seconds, and/or every ten seconds) and/or according to a schedule (e.g., for batch processing). Additionally, or alternatively, the proxy device may provide the network flow logs based on detecting a particular event (e.g., detecting a threshold quantity of communications between servers within a particular time period).

Figure 1C:
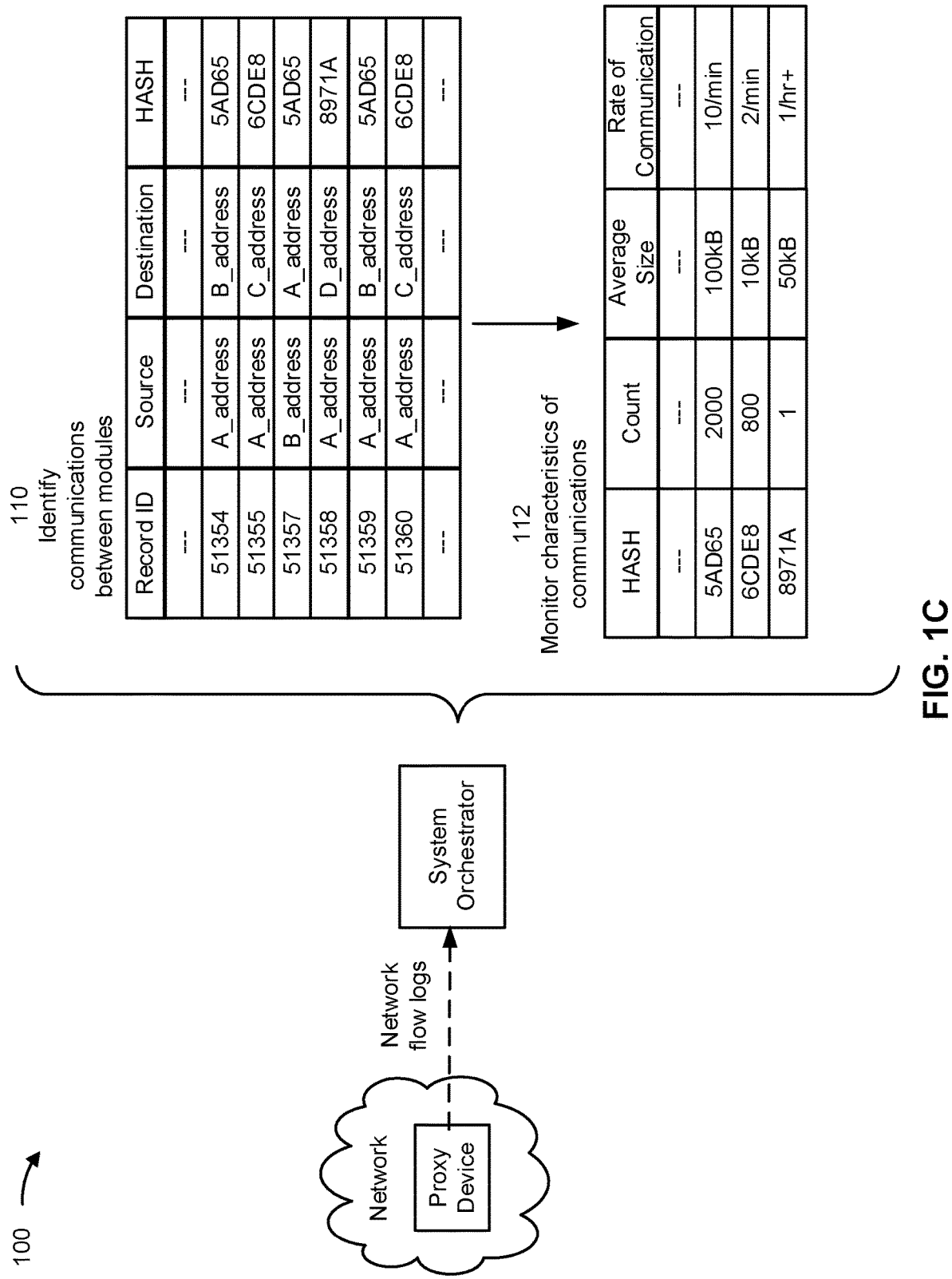

As shown in FIG. 1C, and by reference number 110, the system orchestrator identifies communications between modules. For example, the system orchestrator may identify communications between pairs of modules based on a source address and a destination address identified in the network flow logs (e.g., in records of the network flow logs). More specifically, the system orchestrator may use a hash function to obtain a hash of a source address and a destination address. The hash of the source address and the destination address may be used to indicate a communication between a specific pair of modules associated with the source address and the destination address.

In some implementations, the hash function may be configured to determine a same hash for a first address and a second address, regardless of whether the first address is the source address and the second address is the destination or whether the first address is the destination address and the second address is the first address. For example, as shown in the example of FIG. 1C, record 51354 involves a communication from Module A (represented by the source address being the A_address) to Module B (represented by destination address being B_address) and record 51359 involves a communication from Module B (represented by the source address being the B_address) to Module A (represented by destination address being A_address). As further shown, the hashes of records 51354 and 51359 are a same hash value 5AD65. Accordingly, the hash 51359 may be used to identify and/or represent a communication between a Module A and Module B (e.g., regardless of the direction of the communication). Additionally, or alternatively, a hash may be direction specific (e.g., based on which module is associated with a source address and which module is associated with the destination address). In such a case, two hashes may be used to determine a total quantity of communications between two modules.

As further shown in FIG. 1C, and by reference number 112, the system orchestrator monitors characteristics of the communications between modules. For example, the system orchestrator may utilize hashes associated with pairs of modules to monitor the communications between the modules, as determined from the network flow logs. The characteristics of the communications, as shown, may include a count (e.g., a total quantity of communications during a particular time period), an average size of a communication (e.g., in kilobytes (kB), and/or a rate of communication. The rate of communication may correspond to a quantity of communications within a particular time period, such as a sliding window, and/or based on a length of the time period (e.g., a quantity of communications per unit of time). Accordingly, as shown, the system orchestrator may determine characteristics of communications between Module A and Module B, as represented by the hash value 5AD65, to include 2000 communications, with an average size of 100 kB, and a communication rate of 10 per minute.

Figure 1D:
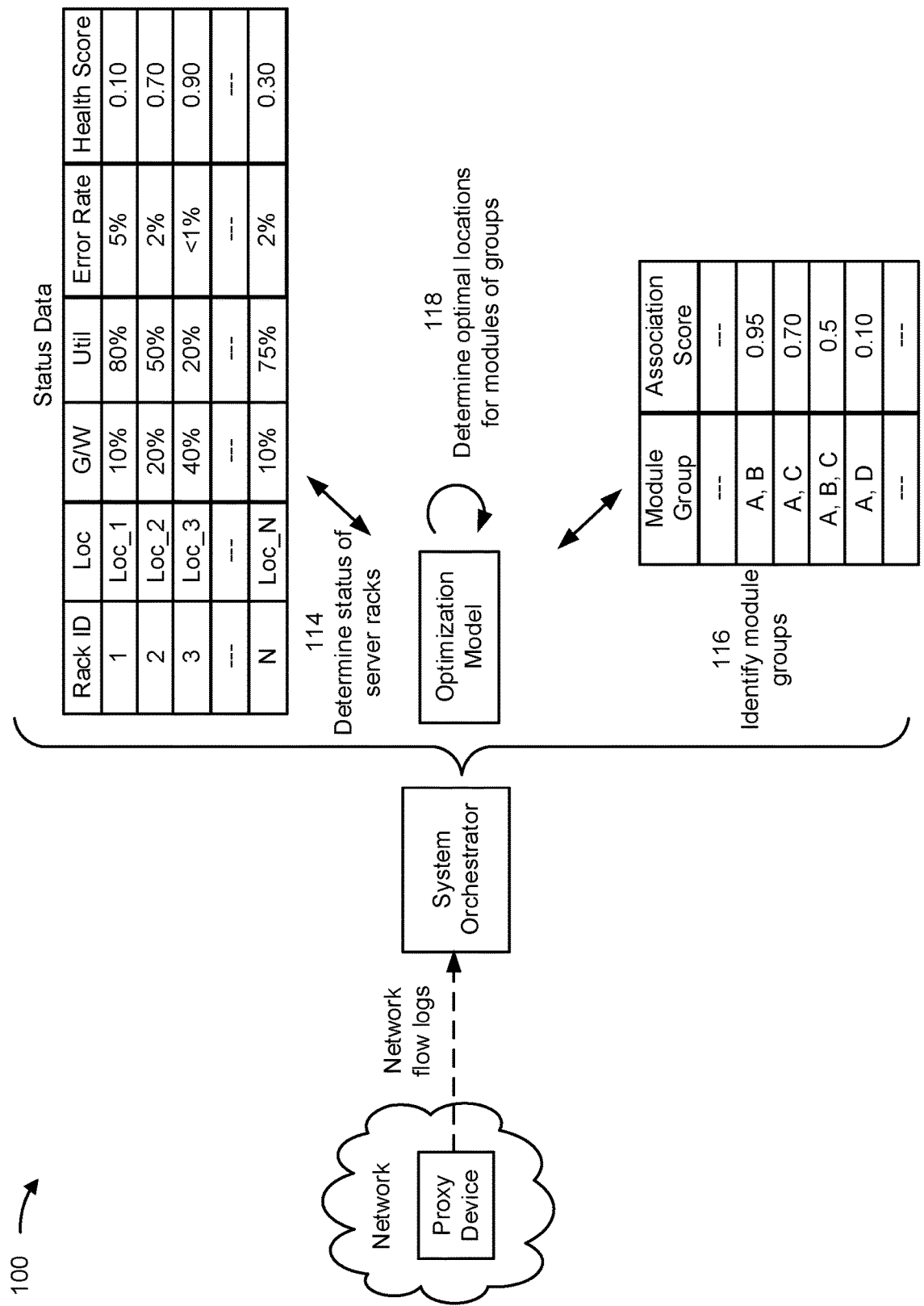

As shown in FIG. 1D, and by reference number 114, the system orchestrator determines the status of the server racks. For example, the system orchestrator may determine the status based on status data received from the orchestration clients (e.g., according to instructions from the system orchestrator and/or according to one or more operations of individual monitoring agents of corresponding servers of the server racks). As shown, the status data may include a gateway utilization (G/W), a utilization of the server racks (Util), a data error rate (Error Rate) associated with the server racks, and/or a health score associated with the server racks. More specifically, for Rack 1 (located at Loc_1), the system orchestrator may determine that Rack 1 is associated with or communicatively coupled with a gateway of the network with a 10% utilization, that utilization of servers of Rack 1 is 80%, that an error rate of Rack 1 is 5%, and that a health score of Rack 1 is 0.10.

An orchestration client may determine and/or provide the utilization of the server rack (e.g., periodically, according to a schedule, and/or based on a request from the system orchestrator). The orchestration client may determine the utilization based on a percentage of the servers (and/or resources of the servers) that are in use and/or actively hosting modules of the platform and/or other platforms associated with other client systems. The orchestration client may determine the utilization based on utilization data from monitoring agents associated with the individual servers of the server racks (e.g., based on the monitoring agents being configured to monitor for utilization according to instructions from the system orchestrator).

The error rate may represent one or more types of performance data of the server racks that may be determined and/or monitored by the orchestration clients and/or the system orchestrator. For example, the error rate may correspond to a percentage of data that is dropped and/or a percentage of communications that are dropped (e.g., a packet error rate) by servers of the server racks (e.g., due to processing capabilities of the servers on the server racks and/or due to congestion of the network). Additionally, or alternatively, the orchestration clients may monitor other types of performance data and/or metrics, such as processing efficiency, processing speed, communication speed, among other examples (e.g., that are obtained from and/or provided by the monitoring agents of the servers).

The health score may be representative of an average health of servers on the server racks and/or an overall health of the servers on the server racks. The health score may be determined using any scoring system (e.g., a weighted average scoring system and/or a prediction scoring system) and may be determined based on any health related indicators, such as available power, available processing capacity, available memory capacity, available storage capacity, and/or duration of use, among other examples. The health score may indicate and/or represent a probability of one or more of the servers of a server rack experiencing a failure (e.g., within an upcoming period of time) and/or a shutdown event. Accordingly, the system orchestrator may monitor the health score to prevent downtime of an operation and/or platform caused by a module being unavailable due to a server or server rack failure.

As further shown in FIG. 1D, and by reference number 116, the system orchestrator identifies module groups of modules of the platforms. For example, as shown, the system orchestrator may identify possible groups of modules based on whether the modules communicate with one another. The system orchestrator may identify and/or monitor the modules to determine whether modules within the group should be co-located and/or relocated to by physically nearer one another (e.g., to reduce latency of communications between modules in a particular group, reduce dropped packets, and/or improve performance of operations of the platform).

In some implementations, the system orchestrator may determine an association score between modules of the respective groups. The association score may represent a probability that the modules are used to perform a single operation and/or that the modules are to coordinate to perform a single operation (e.g., based on communications between the modules). For example, the association score may be determined based on the characteristics of communications between pairs of modules within the group described elsewhere herein. Additionally, or alternatively, the association score may be determined based on characteristics of communications during a same time period between the modules and a same user device during a user session (e.g., indicating that the user device needs to communicate with both modules in association with an operation of the platform). In the example of FIG. 1D, the module group of Module A and Module B may have an association score of 0.95. In example implementation 100, a relatively high association score may indicate that the modules are more likely associated with performance of a same operation and a relatively low association score may indicate that the modules are less likely associated with a same operation.

As further shown in FIG. 1D, and by reference number 118, the optimization model determines optimal locations for modules of the groups. For example, the optimization model may be configured to determine the optimal locations based on the statuses of the server racks and/or the association scores of the module groups. The determined locations may be optimal relative to a configuration of the optimization model, based on a configuration of the distributed host system, and/or based on statuses of the distributed host system. As described elsewhere herein, based on the determined optimal locations of the modules of the group, the system orchestrator may perform one or more actions to relocate the one or more of the modules, such as move one module to a location (e.g., server rack) of another module (e.g., for co-location of the modules), move two modules to a same location (e.g., a same server rack for co-location of the modules), and/or move one module (or both modules) to a new location (e.g., new server racks) that is geographically closer than a previous location of the module.

The system orchestrator may use the status data to determine whether a particular module should be relocated to a particular server rack (e.g., to co-locate the module with another module hosted on the server rack and/or to reduce a distance between the module and another module on a different server rack) and/or whether to re-locate modules from a particular server rack (e.g., and deactivate the server rack to conserve power resources used to power the server rack and/or the orchestration client). For example, the system orchestrator may determine, based on a utilization of a server rack, that the server rack is capable of hosting an additional module (e.g., a module that is to be co-located with another module hosted by a server on the server rack). More specifically, the system orchestrator may determine that the server rack is capable of hosting another module based on the utilization satisfying a utilization threshold. The utilization threshold may be a fixed threshold for the individual server racks and/or a fixed threshold that is the same across all server racks of the distributed host system. For example, the system orchestrator may determine a relatively higher utilization threshold for a server rack based on historical data indicating that the server rack has been capable of maintaining relatively high utilization without sacrificing performance and/or health of the server rack. On the other hand, the system orchestrator may determine that a relatively lower threshold is to be assigned to a server rack based on historical data indicating that the server rack has experienced degraded performance and/or health with a relatively higher utilization.

Additionally, or alternatively, the utilization threshold for a server rack may be dynamically configured according to rack-specific characteristics of the utilization of the server rack. For example, the system orchestrator determines from historical data that utilization of a server rack tends to periodically spike for a short period of time, and the system orchestrator may assign a relatively higher utilization threshold to the server and/or require that the utilization threshold be satisfied for threshold period of time (e.g., so as not to relocate modules during each spike, which could lead to congestion of the network and/or wasted network resources). In such an example, a utilization threshold for a particular server rack may be determined based on a rack-specific average usage of servers (e.g., during a particular time period or sliding window) on the server rack and/or a standard deviation of usage of the servers on the server racks.

In some implementations, the optimization model may determine optimal locations for modules of one or more groups based on whether the modules should and can be co-located on a same server rack (e.g., to minimize the physical distance between the module and minimize the latency caused by the physical distance). For example, the optimization model may be configured to determine a co-location score for a module based on the rate of communication and/or based on the utilization of modules within the group. The co-location score may indicate that modules of a particular group should likely be co-located when the rate of communication between the modules is relatively high and/or when the utilization of one or more of the server racks indicates that there is capacity to host an additional module to permit the modules to be co-located on a same server rack. Additionally, or alternatively, the co-location score may indicate whether co-location of the modules of the group is optimal for an operation associated with the modules in the module group. The system orchestrator may determine the optimal locations based on a comparison of the co-location score and a co-location score threshold.

The co-location score threshold may be based on one or more characteristics of the modules and/or the operation. For example, the co-location score threshold may be different based on a type of the operation and/or a priority associated with the operation that is defined by an optimization hierarchy. More specifically, the optimization model may be configured to determine and/or set the co-location score and/or determine whether two or more of the modules are to be co-located in accordance with the optimization hierarchy (e.g., that is based on priority of types of operations) to determine and/or set the co-location score and/or determine whether two or more of the modules are to be co-located.

Figure 1E:
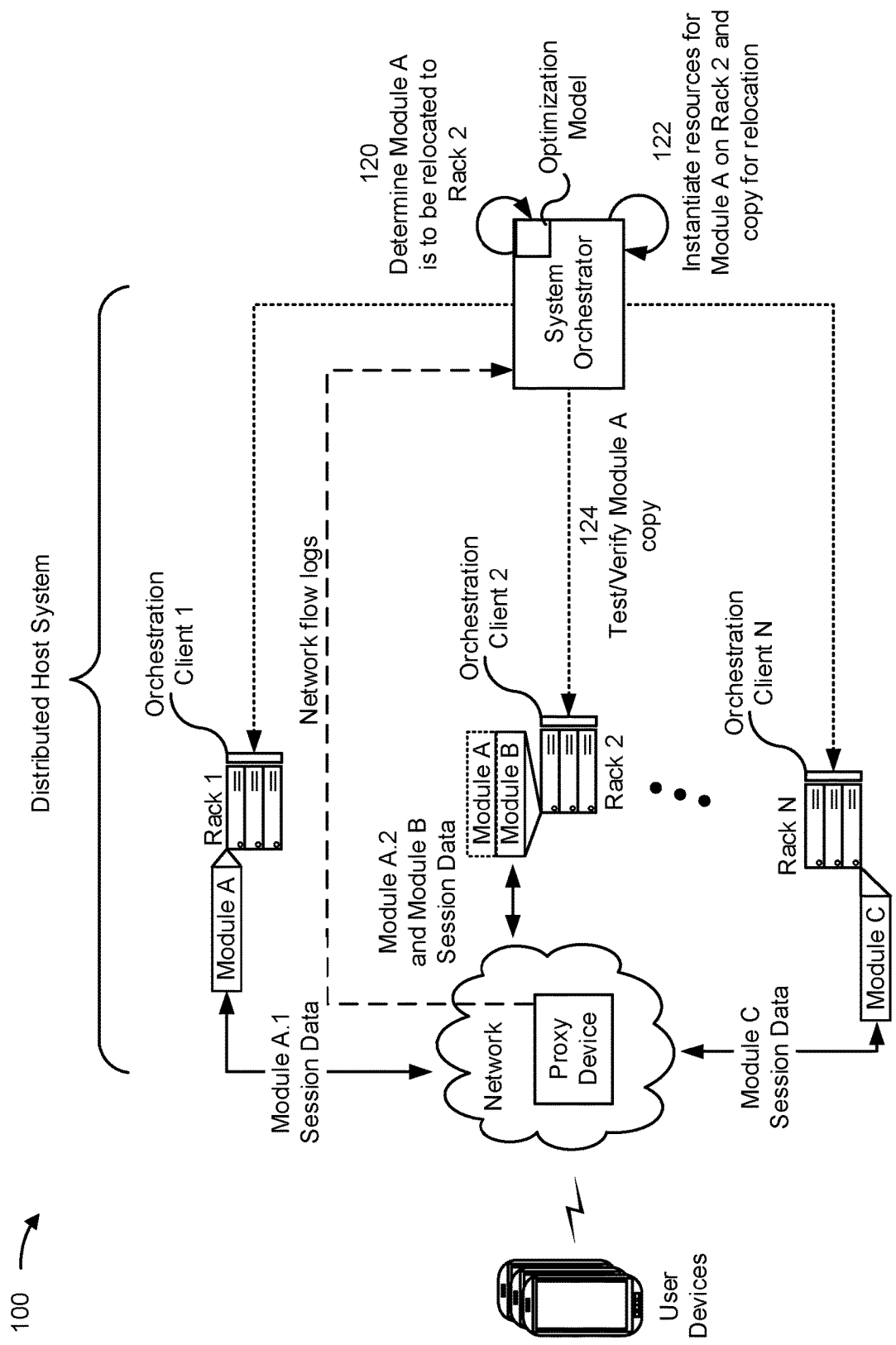

As shown in FIG. 1E, and by reference number 120, the system orchestrator determines that Module A is to be relocated to Rack 2. For example, the system orchestrator, using the optimization model, may determine that Module A is to be relocated to Rack 2 based on utilization of Rack 1 (or other status data) and/or based on a co-location score indicating that Module A and Module B are to be co-located on Rack 2.

In some implementations, based on determining that Module A and Module B are to be co-located, the system orchestrator may determine whether Rack 1 (based on Rack 1 currently hosting Module A) should host Module A and Module B or whether Rack 2 (based on Rack 2 currently hosting Module B) should host Module A and Module B. For example, the system orchestrator may select from Rack 1 or Rack 2 based on utilization of Rack 1 and/or Rack 2. In example implementation 100, because Rack 2 had a relatively lower utilization, the system orchestrator may select Rack 2 (rather than Rack 1) for co-location of Module A and Module B. Additionally, or alternatively, the system orchestrator may select Rack 2 to host Module A and Module B based on differences between respective utilizations and respective utilization thresholds of Rack 1 and Rack 2 and/or based on ratios between utilizations and respective utilization thresholds of Rack 1 and Rack 2.

In some implementations, if system orchestrator determines that the utilization of Rack 1 and/or Rack 2 is relatively high (e.g., when compared to designated utilization thresholds Rack 1 and Rack 2, respectively), the system orchestrator may identify a server rack that is between Rack 1 and Rack 2 and provision that server rack to host Module A and/or Module B to co-locate Module A and Module B and/or to reduce a physical distance between Module A and Module B. The system orchestrator may select the server rack based on reference location information (e.g., a geographical grid system and/or a geographical coordinate system) and rack location information that identifies the locations of Rack 1, Rack 2, and/or the server rack that is physically be Rack 1 and Rack 2.

As further shown in FIG. 1E, and by reference number 122, the system orchestrator instantiates resources for Module A on Rack 2 and copies Module A to Rack 2 for relocation. For example, rather than redistributing Module A to Rack 2 by removing and instantiating Module A on a server of Rack 2, the system orchestrator may copy Module A to Rack 2 to maintain reliability of operations of the platform that involve Module A. In this way, the system orchestrator may prevent operations (e.g., ongoing and/or scheduled operations) involving Module A to experience failures and/or be dropped.

As further shown in FIG. 1E, and by reference number 124, the system orchestrator tests and/or verifies the Module A copy. The system orchestrator may text and/or verify the Module A copy to ensure that the relocation of Module A to Rack 2 is sustainable and/or to ensure that a service (e.g., a task and/or a workflow) associated with Module A can continue without interruption. In some implementations, the system orchestrator may test the Module A copy by causing a subset of session data (shown as Module A.2 Session Data) to be routed to the Rack 2 while the remaining session data (shown as Module A.1 Session Data) continues to be routed to Rack 1. During a testing period the system orchestrator may monitor the utilization of Rack 2 while incrementally increasing the amount of the Module A session data that is routed to Rack 2 to ensure (e.g., during the testing period) that Rack 2 does not become overloaded and/or that Rack 2 reaches a utilization that prevents Rack 2 from hosting Module A. If, during the testing period, the utilization of the Rack 2 reaches a utilization threshold indicating that Rack 2 will not be able to successfully host Module A, the system orchestrator may cease the migration of Module A from Rack 1 to Rack 2 (e.g., to prevent Rack 2 from becoming overloaded and/or permit Module A to continue to be available for operations of the platform). Furthermore, in such a case, the system orchestrator may identify another server rack (e.g., a server rack that is geographically between Rack 1 and Rack 2) to host Module A and similarly attempt to relocate Module A to the other server rack.

If, during the testing period, the utilization of Rack 2 does not reach a utilization threshold associated with Rack 2 being unable to host Module A, the system orchestrator may verify that Rack 2 is capable of hosting Module A and/or facilitating an operation associated with Module A and Module B. In this way, the system orchestrator may facilitate co-location and/or relocation of Module A without interrupting or delaying performance of tasks, workflows, and/or requests associated with Module A.

Figure 1F:
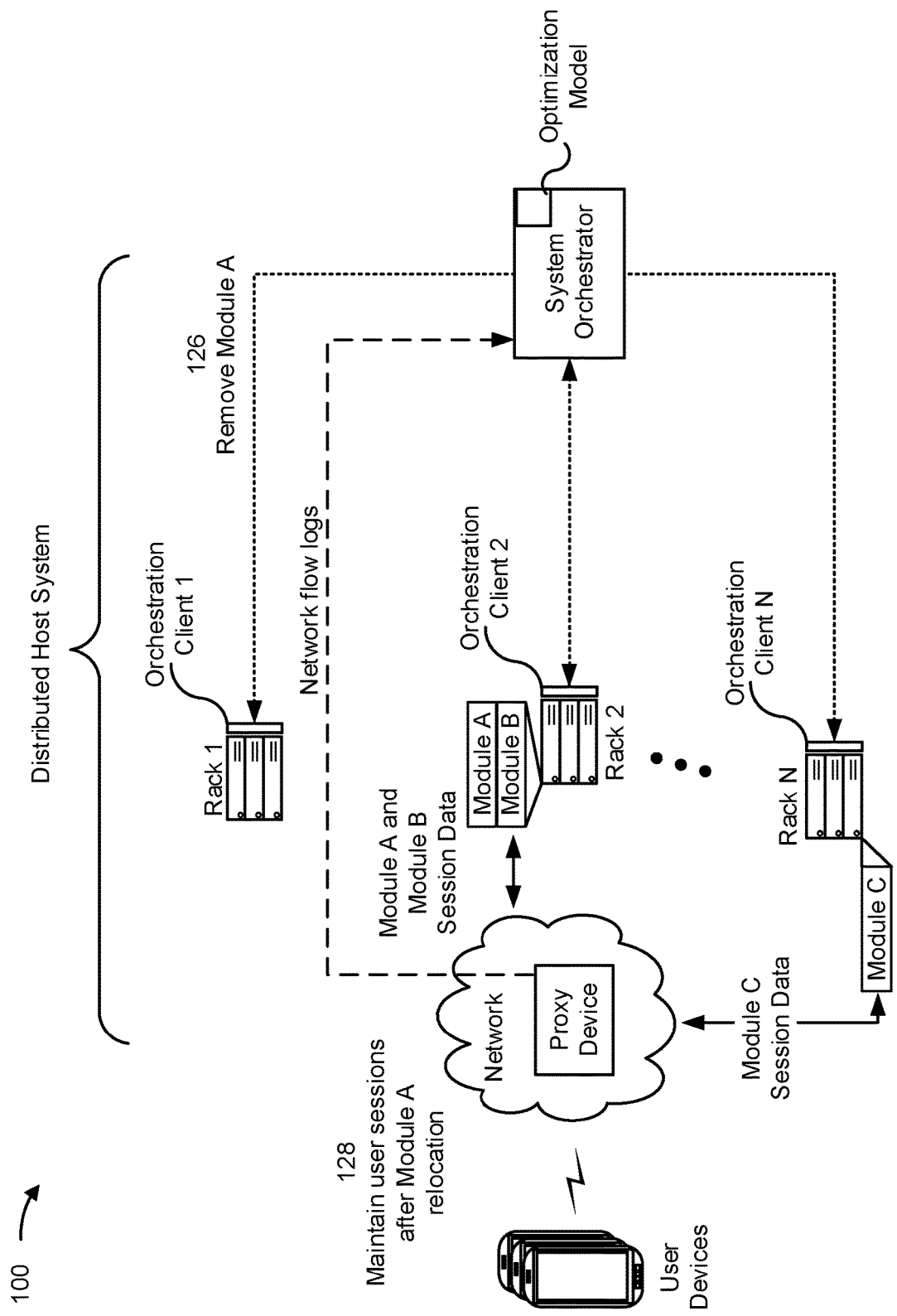

As further shown in FIG. 1F, and by reference number 126, based on verifying that Rack 2 is capable of hosting Module A, the system orchestrator may remove Module A from Rack 1. For example, the system orchestrator may remove Module A from Rack 1 to reduce or prevent consumption or resources of servers of Rack 1, that would otherwise be unnecessary because Rack 2 is configured to host Module A and an operation involving Module A and Module B can be performed with improved latency with respect to Module A and Module B being co-located on Rack 2.

As further shown in FIG. 1F, and by reference number 128, the distributed host system maintains the user sessions after Module A relocation. For example, as shown, session data between Module A and Module B may be communicated within Rack 2 (e.g., with minimal latency due to Module A and Module B being geographically co-located). Further, session data involving Module A and another module (e.g., Module C) and/or session data involving Module B and another module (e.g., Module C) is communicated between Rack 2 and the network (e.g., to be communicated to Module C and/or to other modules of the platform). Further, session data associated with Module C continues to be communicated between Rack N and the network (e.g., to Module A, to Module B, and/or to other modules of the platform).

Accordingly, as described herein, the system orchestrator of the distributed host platform may reduce the latency of communications between modules of a platform hosted within a distributed system. For example, as described herein, the system orchestrator may monitor and/or receive status data from orchestration clients, monitoring communications between the modules to identify modules that are associated with a same operation of the platform, and perform one or more actions to co-locate and/or relocate one or more of the modules to reduce a distance between the modules, thereby improving the latency of the communications, which results in improved performance of the operation and/or the platform.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
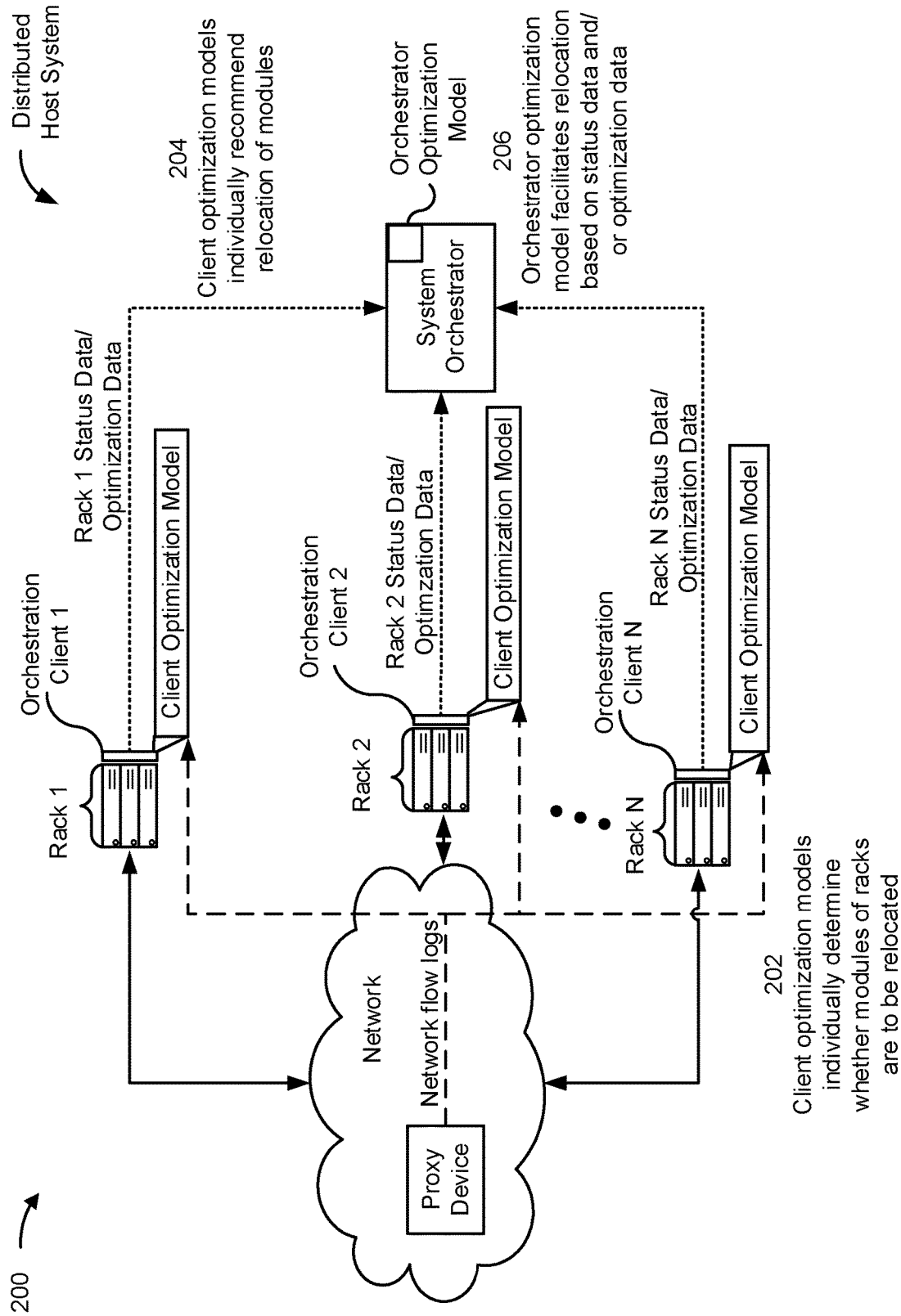
FIG. 2 is a diagram of another example implementation relating to dynamically managing locations of modules of a platform hosted by a distributed system.

FIG. 2 is a diagram of an example implementation 200 associated with dynamic management of locations of modules of a platform hosted by a distributed system. As shown in FIG. 2, example implementation 200 includes a distributed host system (e.g., which may correspond to the distributed host system of example implementation 100) a system orchestrator, N server racks (shown as Rack 1 to Rack N), N orchestration clients (shown as Orchestration Client 1 to Orchestration Client N), and a proxy device within a network. These devices are described in more detail below in connection with FIG. 4 and FIG. 5.

In example implementation 200, the system orchestrator includes an orchestrator optimization model, and the individual orchestration clients include respective client optimization models. The orchestrator optimization model and the client optimization models of the orchestration clients may be a same type of model, similar to a type of the optimization model of example implementation 100.

As shown in FIG. 2, and by reference number 202, the client optimization models individually determine whether modules hosted on corresponding server racks of the distributed host system are to be relocated. For example, Orchestration Client 1, based on received network flow logs from the proxy device and/or monitoring communications of servers of Rack 1, may determine, using the client optimization model, that a module should be relocated to another rack (e.g., one or more of Rack 2 to Rack N) of the distributed host system. Additionally, or alternatively, Orchestration Client 1 may determine that the module should be relocated from Rack 1 based on a utilization of Rack 1 (e.g., the utilization being below a utilization threshold).

As further shown in FIG. 2, and by reference number 204, the client optimization models individually recommend relocation of modules. For example, referring to the example above, Orchestration Client 1 may send a recommendation to the system orchestrator and/or the orchestrator optimization model to verify that the module of Rack 1 should be relocated from Rack 1. In some implementations, Orchestration Client 1 may suggest a targeted server rack for relocation of the module (e.g., a same server rack as another module for co-location of the modules). Additionally, or alternatively, Orchestration Client 1 may request the orchestrator optimization model to indicate a new location (or server rack) that is to host the model (e.g., based on information from the other client optimization models and/or status data associated with the other server racks).

As further shown in FIG. 2, and by reference number 206, the orchestrator optimization model facilitates relocation of the module based on the status data and/or optimization data that is received from the client optimization models. For example, the orchestrator optimization model may compare the recommendation from Orchestration Client 1 with recommendations from one or more other orchestration clients (e.g., one or more of Orchestration Client 1 to Orchestration Client N) to determine whether the module should be relocated and/or to determine a target location for the module. The orchestrator optimization model may facilitate the relocation of the module based on the comparison (e.g., based on one or more of the other client optimization models recommend the relocation of the same module).

In some implementations, the orchestrator optimization model and the client optimization models may be configured to implement a federated machine learning technique. In such a case, the client optimization models provide feedback to the orchestrator optimization model that is associated with relocating one or more modules of the platform. The feedback may indicate feature data associated with observations by the client optimization models that cause the client optimization models to relocate a module and/or co-locate multiple modules. Further, the orchestrator optimization model may redistribute the feedback and training data for one or more of the other orchestration clients, thereby permitting the distributed host system to continuously and dynamically learn optimal locations for modules based on performed relocations of modules (e.g., according to one or more training techniques described herein).

Accordingly, as described herein, the orchestrator optimization model and the client optimization models may independently be configured to monitor communications between modules of a platform and/or statuses of server racks of the orchestration clients to determine whether one or more of the modules should be relocated to improve performance of an operation of the platform, as described above.

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
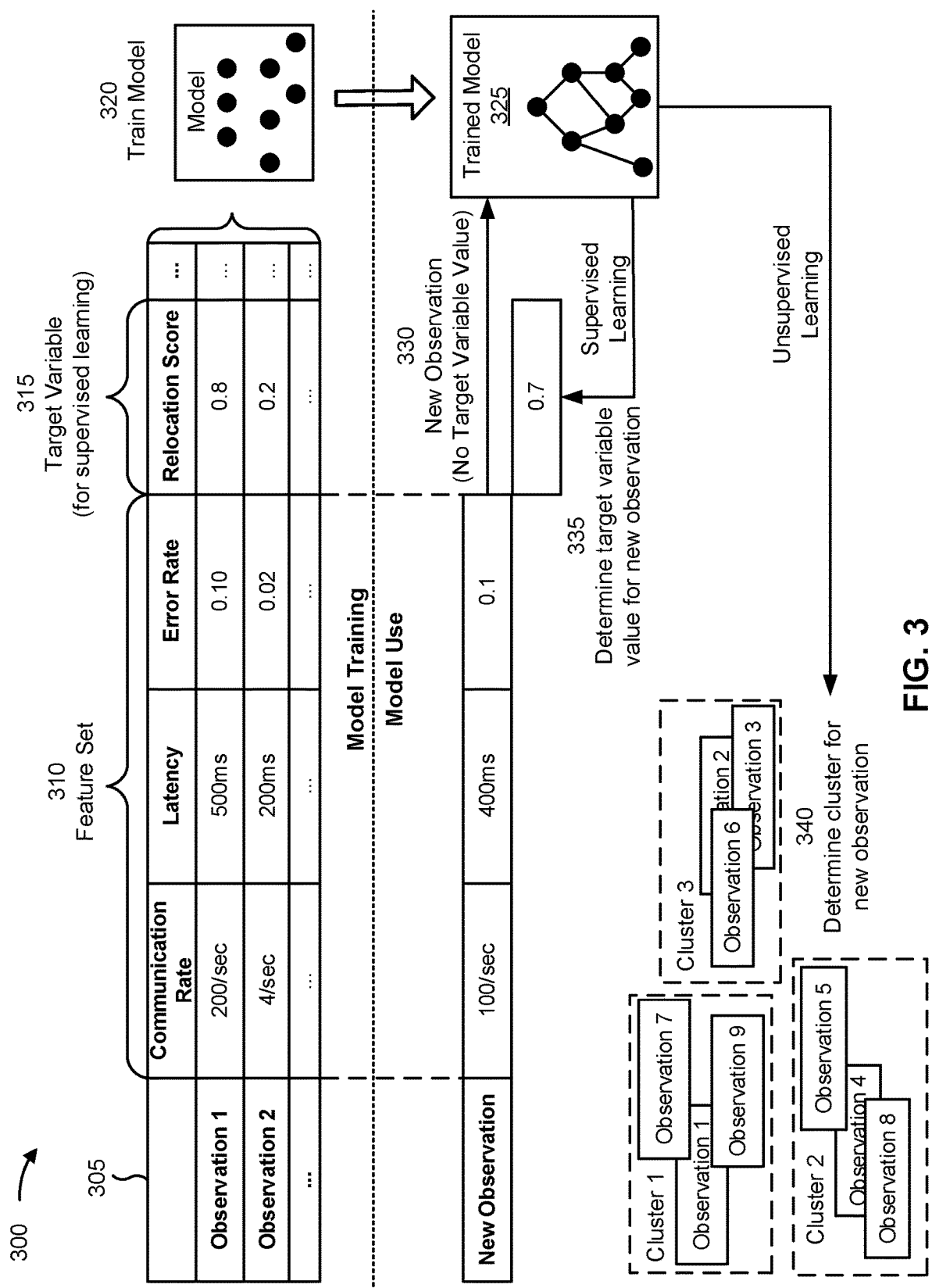
FIG. 3 is a diagram illustrating one or more example implementations of training and using a machine learning model in connection with dynamic management of locations of modules of a platform hosted by a distributed system.

FIG. 3 is a diagram illustrating an example 300 of training and using a machine learning model in connection with dynamic management of locations of modules of a platform hosted by a distributed system. The machine learning model training and usage described herein may be performed using a machine learning system. The machine learning system may include or may be included in a computing device, a server, a cloud computing environment, or the like, such as the distributed host system (e.g., within the system orchestrator and/or one or more of the orchestration clients) described in more detail elsewhere herein.

As shown by reference number 305, a machine learning model may be trained using a set of observations. The set of observations may be obtained from training data (e.g., historical data), such as data gathered during one or more processes described herein. In some implementations, the machine learning system may receive the set of observations (e.g., as input) from the servers, orchestration clients, and/or the user devices, as described elsewhere herein.

As shown by reference number 310, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the servers, orchestration clients, and/or the user devices. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of an communication rate (e.g., between a set of modules), a second feature of a latency (e.g., an average latency of communications between the set of modules), a third feature of an error rate (e.g., a percentage of data and/or communications that are lost or dropped), and so on. As shown, for a first observation, the first feature may have a value of 200 per second, the second feature may have a value of 500 milliseconds (ms), the third feature may have a value of 0.10, and so on. These features and feature values are provided as examples and may differ in other examples. For example, the feature set may include one or more of the following features: types of modules of the observations, types of operations associated with the modules, types of communications between the modules, status data (e.g., utilization data, performance data, and/or health data) associated with servers hosting the modules, and/or status data associated with server racks of the servers hosting the modules.

As shown by reference number 315, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 300, the target variable is a relocation score, which has a value of 0.8 for the first observation.

The feature set and target variable described above are provided as examples, and other examples may differ from what is described above. For example, for a target variable of 0.8, the feature set may include feature data that indicates an 80 percent probability that relocating one or more modules of the observation would improve the performance of an operation performed by the modules. In some implementations, the relocation score may be observed and/or compared with a threshold score that indicates whether one or more of a set of modules should be relocated to improve an operation performed by the set of modules. For example, the threshold score may be a fixed score that is configured to cause the machine learning model to provide a binary output (e.g., as a binary classification model) that indicates whether or not a module of the set of modules are to be relocated. More specifically, for Observation 1, if the threshold score is less than 0.8, the machine learning model may be trained to determine that a module associated with Observation 1 is to be relocated. Additionally, or alternatively, the relocation score may indicate or represent a degree to which modules of an observation are to be relocated. For example, a relatively higher relocation score may indicate that modules of the observations should be relatively physically closer to one another and a relatively lower relocation score may indicate that the modules can be relatively physically further apart from one another.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 320, the machine learning system may train a machine learning model using the set of observations and using one or more machine learning algorithms, such as a regression algorithm, a decision tree algorithm, a clustering model, a neural network algorithm, a k-nearest neighbor algorithm, a support vector machine algorithm, or the like. After training, the machine learning system may store the machine learning model as a trained machine learning model 325 to be used to analyze new observations.

As shown by reference number 330, the machine learning system may apply the trained machine learning model 325 to a new observation, such as by receiving a new observation and inputting the new observation to the trained machine learning model 325. As shown, the new observation may include a first feature of a communication rate, a second feature of a latency, a third feature of an error rate, and so on, as an example. The machine learning system may apply the trained machine learning model 325 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 325 may predict a value of 0.7 for the target variable of a relocation score for the new observation, as shown by reference number 335. The predicted value of 0.7 may be indicate that one or more modules of the new observation should be relocated (e.g., based on 0.7 satisfying a threshold score). Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include a recommendation to relocate a module associated with the new observation, a recommendation to reduce a physical distance between two or more modules associated with the new observation, a recommendation to co-locate two or more modules associated with the new observation, and/or a recommendation to test a copy of a module on a new server rack. The first automated action may include, for example, relocating one or more modules associated with the new observation, reducing a physical distance between two or more modules associated with the new observation, co-locating two or more modules associated with the new observation, and/or testing a copy of one or more modules on a new server rack to determine whether the one or more modules can be relocated to the separate location.

As another example, if the machine learning system were to predict a value of 0.2 for the target variable of the relocation score, then the machine learning system may provide a second (e.g., different) recommendation (e.g., not to relocate any modules associated with the observation) and/or may perform or cause performance of a second (e.g., different) automated action (e.g., prevent relocation of any of the modules associated with the new observation).

In some implementations, the trained machine learning model 325 may classify (e.g., cluster) the new observation in a cluster, as shown by reference number 340. The observations within a cluster may have a threshold degree of similarity. As an example, if the machine learning system classifies the new observation in a first cluster (e.g., co-location of modules associated with the observation improves performance), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., co-location of modules associated with the observation does not impact performance), then the machine learning system may provide a second (e.g., different) recommendation (e.g., a recommendation not to waste resources relocating a module or co-locating a module) and/or may perform or cause performance of a second (e.g., different) automated action, such as preventing a relocation of one or more modules.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In this way, the machine learning system may apply a rigorous and automated process to dynamically manage locations of modules of a platform hosted by a distributed system. The machine learning system enables recognition and/or identification of tens, hundreds, thousands, or millions of features and/or feature values for tens, hundreds, thousands, or millions of observations, thereby increasing accuracy and consistency and reducing delay associated with dynamic management of locations of modules of a platform hosted by a distributed system relative to requiring computing resources to be allocated for tens, hundreds, or thousands of operators to manually manage locations of modules of a platform hosted by a distributed system using the features or feature values.

As indicated above, FIG. 3 is provided as an example. Other examples may differ from what is described in connection with FIG. 3.

Figure 4:
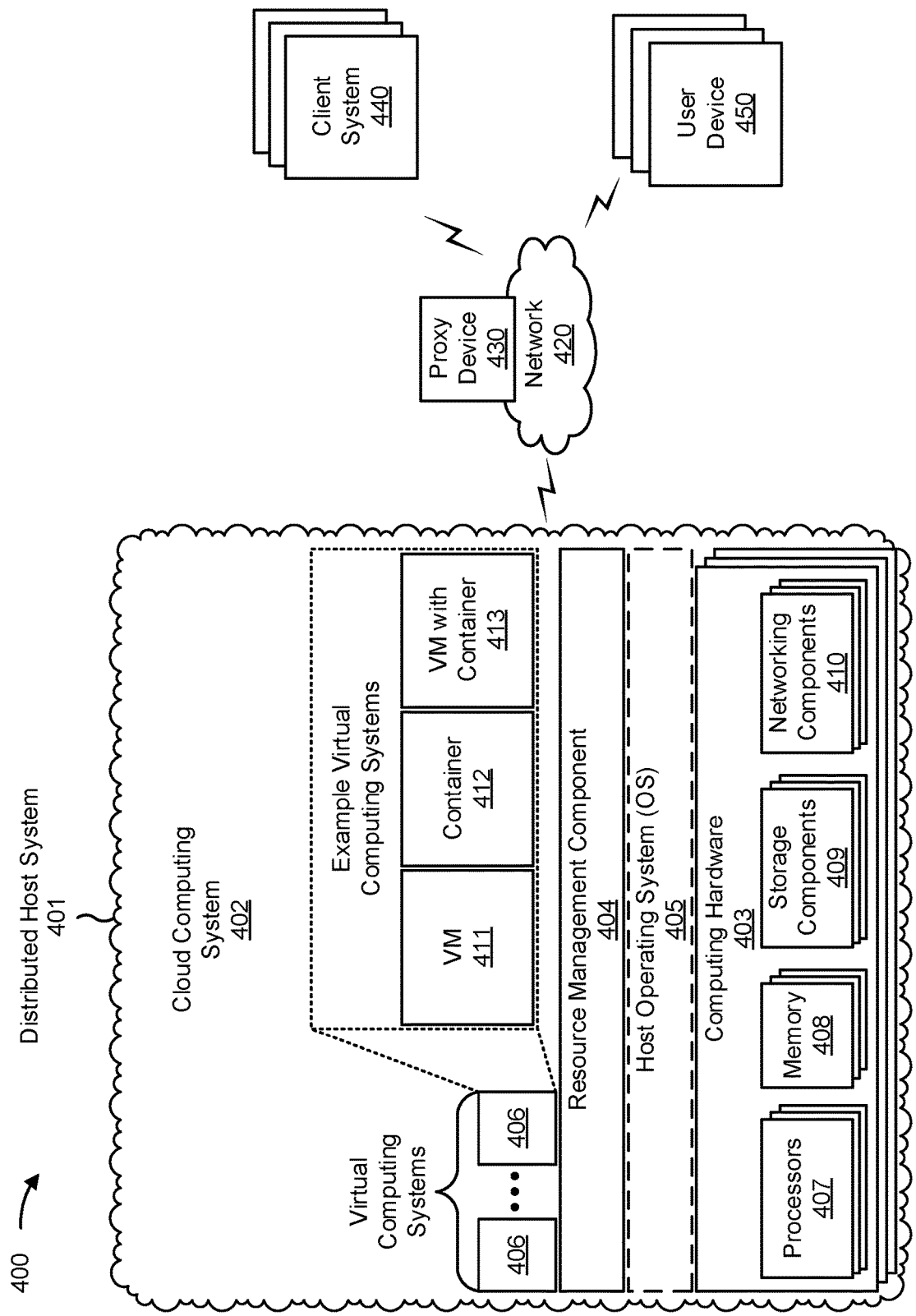
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a distributed host system 401, which may include one or more elements of and/or may execute within a cloud computing system 402. The cloud computing system 402 may include one or more elements 403-413, as described in more detail below. As further shown in FIG. 4, environment 400 may include a network 420, a proxy device 430, one or more client systems 440, and/or one or more user devices 450. Devices and/or elements of environment 400 may interconnect via wired connections and/or wireless connections.

The cloud computing system 402 includes computing hardware 403, a resource management component 404, a host operating system (OS) 405, and/or one or more virtual computing systems 406. The resource management component 404 may perform virtualization (e.g., abstraction) of computing hardware 403 to create the one or more virtual computing systems 406. Using virtualization, the resource management component 404 enables a single computing device (e.g., a computer, a server, and/or the like) to operate like multiple computing devices, such as by creating multiple isolated virtual computing systems 406 from computing hardware 403 of the single computing device. In this way, computing hardware 403 can operate more efficiently, with lower power consumption, higher reliability, higher availability, higher utilization, greater flexibility, and lower cost than using separate computing devices.

Computing hardware 403 includes hardware and corresponding resources from one or more computing devices. For example, computing hardware 403 may include hardware from a single computing device (e.g., a single server) or from multiple computing devices (e.g., multiple servers), such as multiple computing devices in one or more data centers. As shown, computing hardware 403 may include one or more processors 407, one or more memories 408, one or more storage components 409, and/or one or more networking components 410. Examples of a processor, a memory, a storage component, and a networking component (e.g., a communication component) are described elsewhere herein.

The resource management component 404 includes a virtualization application (e.g., executing on hardware, such as computing hardware 403) capable of virtualizing computing hardware 403 to start, stop, and/or manage one or more virtual computing systems 406. For example, the resource management component 404 may include a hypervisor (e.g., a bare-metal or Type 1 hypervisor, a hosted or Type 2 hypervisor, and/or the like) or a virtual machine monitor, such as when the virtual computing systems 406 are virtual machines 411. The resource management component 404 may include and/or correspond to the system orchestrator and/or one or more of the orchestration clients of example implementation 100 and/or example 200 described above. Additionally, or alternatively, the resource management component 404 may include a container manager, such as when the virtual computing systems 406 are containers 412. In some implementations, the resource management component 404 executes within and/or in coordination with a host operating system 405.

A virtual computing system 406 includes a virtual environment that enables cloud-based execution of operations and/or processes described herein using computing hardware 403. As shown, a virtual computing system 406 may include a virtual machine 411, a container 412, a hybrid environment 413 that includes a virtual machine and a container, and/or the like. A virtual computing system 406 may execute one or more applications using a file system that includes binary files, software libraries, and/or other resources required to execute applications on a guest operating system (e.g., within the virtual computing system 406) or the host operating system 405.

Although the distributed host system 401 may include one or more elements 403-413 of the cloud computing system 402, may execute within the cloud computing system 402, and/or may be hosted within the cloud computing system 402, in some implementations, the distributed host system 401 may not be cloud-based (e.g., may be implemented outside of a cloud computing system) or may be partially cloud-based. For example, the distributed host system 401 may include one or more devices that are not part of the cloud computing system 402, such as device 500 of FIG. 5, which may include a standalone server or another type of computing device. The distributed host system 401 may perform one or more operations and/or processes described in more detail elsewhere herein.

Network 420 includes one or more wired and/or wireless networks. For example, network 420 may include a cellular network, a public land mobile network (PLMN), a local area network (LAN), a wide area network (WAN), a private network, the Internet, and/or the like, and/or a combination of these or other types of networks. The network 420 enables communication among the devices of environment 400.

The proxy device 430 includes one or more devices capable of receiving, processing, storing, routing, and/or providing information associated with traffic (e.g., a packet and/or other information or metadata) communicated via the network 420, in a manner described herein. For example, the proxy device 430 may include a network server (e.g., a proxy server, a cloud server, and/or a datacenter server, and/or the like), a load balancer, and/or a similar device. In some implementations, the proxy device 430 may be a physical device implemented within a housing, such as a chassis. In some implementations, the proxy device 430 may be a virtual device implemented by one or more computing devices of a cloud computing environment or a data center.

The client system 440 includes one or more devices capable of receiving, generating, storing, processing, providing, and/or routing information associated with a platform that is hosted by the distributed host system 401, as described elsewhere herein. The client system 440 may include a communication device and/or a computing device. For example, the client system 440 may include a server, such as a client server, a web server, a database server, a host server, a proxy server, a virtual server (e.g., executing on computing hardware), or a server in a cloud computing system. In some implementations, the client system includes computing hardware used in a cloud computing environment.

The user device 450 includes one or more devices capable of receiving, generating, storing, processing, and/or providing information associated with receiving or accessing a service of a platform hosted by distributed host system 401, as described elsewhere herein. The user device 450 may include a communication device and/or a computing device. For example, the user device 450 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
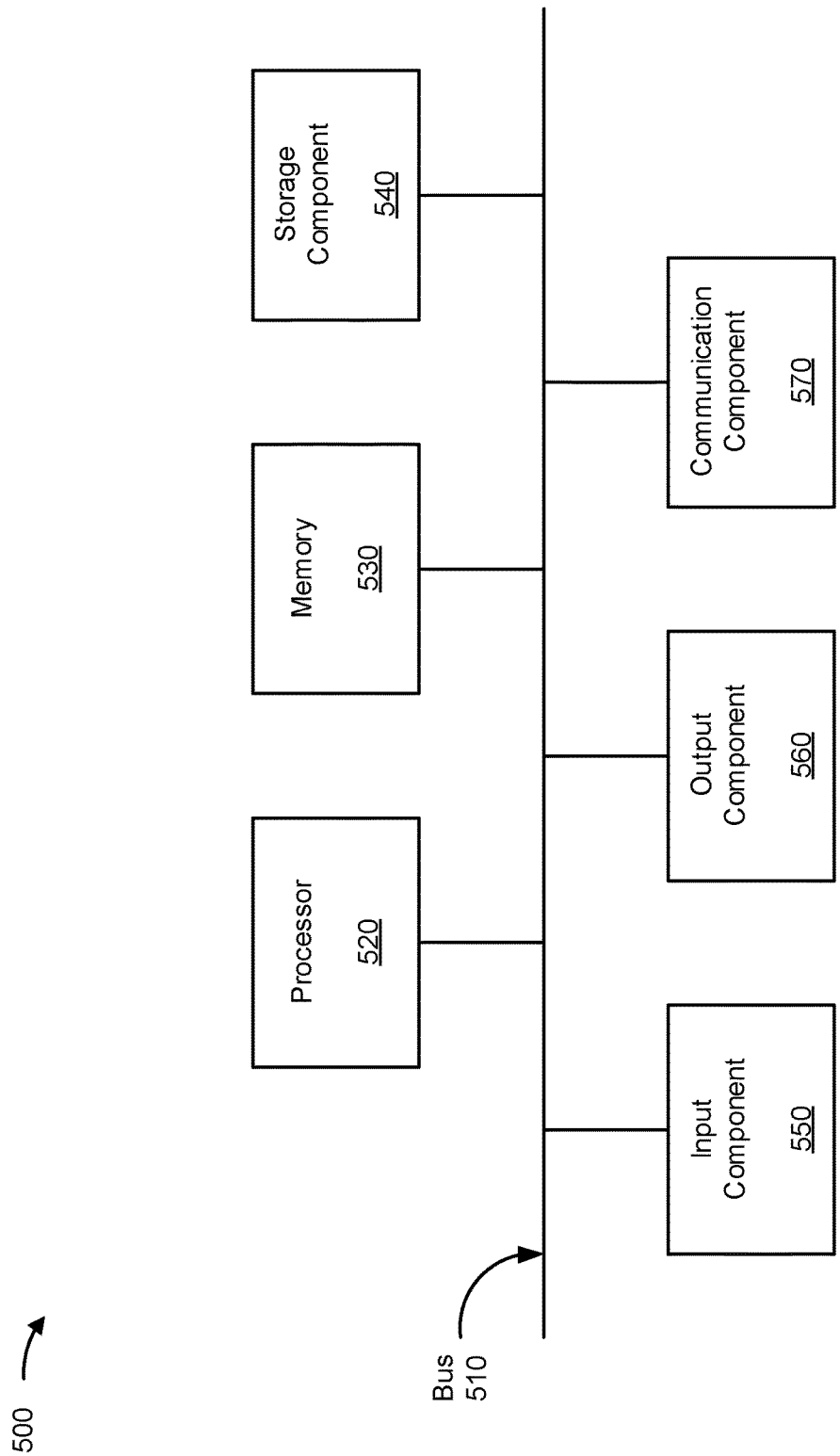
FIG. 5 is a diagram of example components of one or more devices of FIG. 4.

FIG. 5 is a diagram of example components of a device 500, which may correspond to the distributed host system 401, the proxy device 430, the client system 440, and/or the user device 450. In some implementations, the distributed host system 401, the proxy device 430, the client system 440, and/or the user device 450 may include one or more devices 500 and/or one or more components of device 500. As shown in FIG. 5, device 500 may include a bus 510, a processor 520, a memory 530, a storage component 540, an input component 550, an output component 560, and a communication component 570.

Bus 510 includes a component that enables wired and/or wireless communication among the components of device 500. Processor 520 includes a central processing unit, a graphics processing unit, a microprocessor, a controller, a microcontroller, a digital signal processor, a field-programmable gate array, an application-specific integrated circuit, and/or another type of processing component. Processor 520 is implemented in hardware, firmware, or a combination of hardware and software. In some implementations, processor 520 includes one or more processors capable of being programmed to perform a function. Memory 530 includes a random access memory, a read only memory, and/or another type of memory (e.g., a flash memory, a magnetic memory, and/or an optical memory).

Storage component 540 stores information and/or software related to the operation of device 500. For example, storage component 540 may include a hard disk drive, a magnetic disk drive, an optical disk drive, a solid state disk drive, a compact disc, a digital versatile disc, and/or another type of non-transitory computer-readable medium. Input component 550 enables device 500 to receive input, such as user input and/or sensed inputs. For example, input component 550 may include a touch screen, a keyboard, a keypad, a mouse, a button, a microphone, a switch, a sensor, a global positioning system component, an accelerometer, a gyroscope, and/or an actuator. Output component 560 enables device 500 to provide output, such as via a display, a speaker, and/or one or more light-emitting diodes. Communication component 570 enables device 500 to communicate with other devices, such as via a wired connection and/or a wireless connection. For example, communication component 570 may include a receiver, a transmitter, a transceiver, a modem, a network interface card, and/or an antenna.

Device 500 may perform one or more processes described herein. For example, a non-transitory computer-readable medium (e.g., memory 530 and/or storage component 540) may store a set of instructions (e.g., one or more instructions, code, software code, and/or program code) for execution by processor 520. Processor 520 may execute the set of instructions to perform one or more processes described herein. In some implementations, execution of the set of instructions, by one or more processors 520, causes the one or more processors 520 and/or the device 500 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 5 are provided as an example. Device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
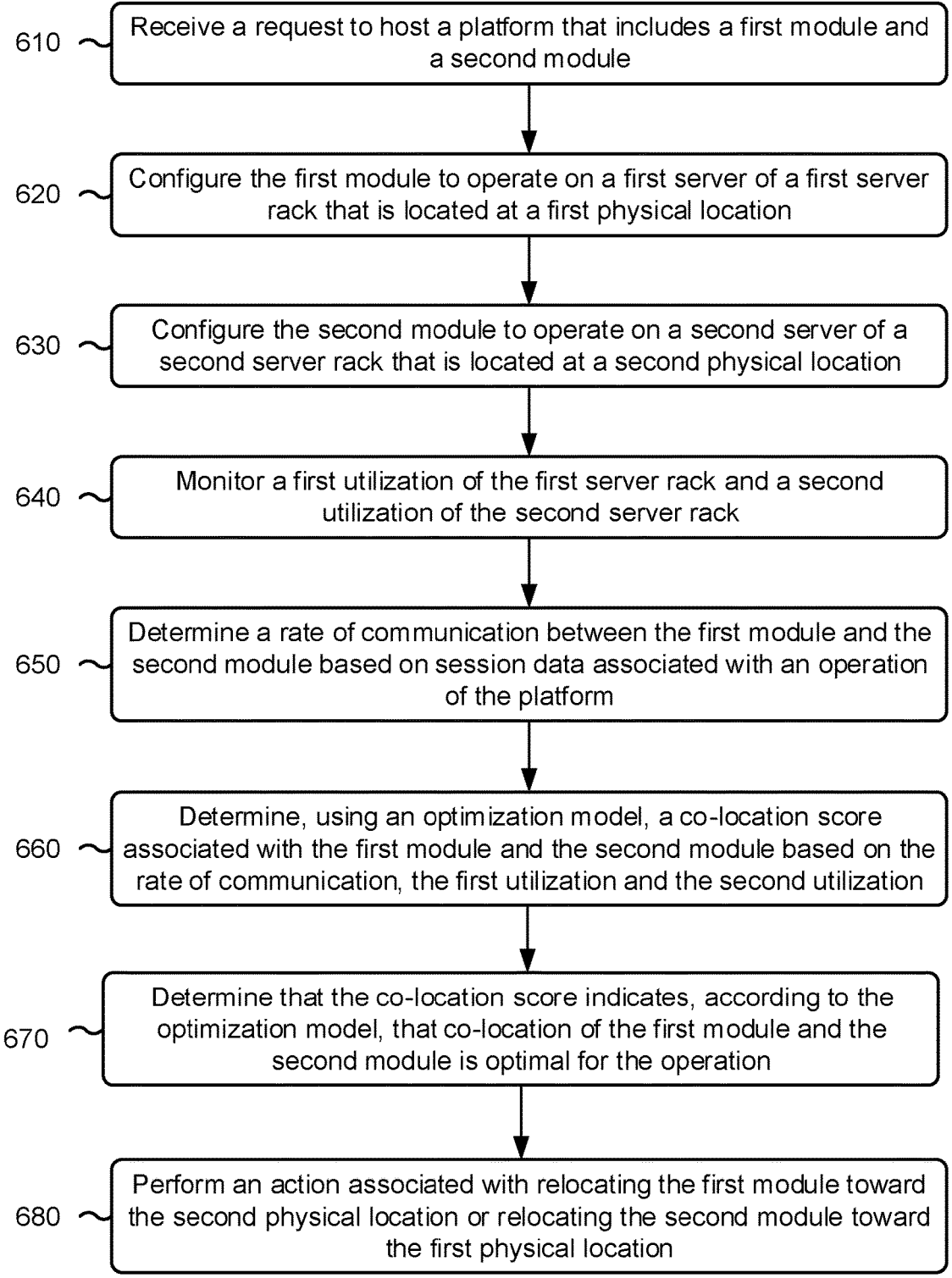
FIG. 6 is a flowchart of an example process relating to dynamically managing locations of modules of a platform hosted by a distributed system.

FIG. 6 is a flowchart of an example process 600 associated with dynamic management of locations of modules of a distributed system. In some implementations, one or more process blocks of FIG. 6 may be performed by a distributed host system (e.g., the distributed host system 401). In some implementations, one or more process blocks of FIG. 6 may be performed by another device or a group of devices separate from or including the distributed host system, such as the proxy device 430, the client system 440, and/or the user device 450. Additionally, or alternatively, one or more process blocks of FIG. 6 may be performed by one or more components of device 500, such as processor 520, memory 530, storage component 540, input component 550, output component 560, and/or communication component 570.

As shown in FIG. 6, process 600 may include receiving a request to host a platform that includes a first module and a second module (block 610). As further shown in FIG. 6, process 600 may include configuring the first module to operate on a first server of a first server rack that is located at a first physical location (block 620). As further shown in FIG. 6, process 600 may include configuring the second module to operate on a second server of a second server rack that is located at a second physical location (block 630). As further shown in FIG. 6, process 600 may include monitoring a first utilization of the first server rack and a second utilization of the second server rack (block 640).

As further shown in FIG. 6, process 600 may include determining a rate of communication between the first module and the second module based on session data associated with an operation of the platform (block 650). As further shown in FIG. 6, process 600 may include determining, using an optimization model, a co-location score associated with the first module and the second module based on the rate of communication, the first utilization and the second utilization (block 660). In some implementations, the co-location score is indicative of whether co-location of the first module and the second module is optimal for the operation according to the optimization model.

As further shown in FIG. 6, process 600 may include determining that the co-location score indicates, according to the optimization model, that co-location of the first module and the second module is optimal for the operation (block 670). As further shown in FIG. 6, process 600 may include performing an action associated with relocating the first module toward the second physical location or relocating the second module toward the first physical location (block 680).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A device for dynamically managing locations of modules of a distributed host system, the device comprising:
  one or more memories; and
  one or more processors, communicatively coupled to the one or more memories, configured to:
    receive a request to host a platform that includes a first module and a second module;
    configure the first module to operate on a first server of a first server rack that is located at a first physical location;
    configure the second module to operate on a second server of a second server rack that is located at a second physical location;
    monitor a first utilization relative to a first utilization threshold of the first server rack and a second utilization relative to a second utilization threshold of the second server rack;
    determine a rate of communication between the first module and the second module based on session data associated with an operation of the platform;
    determine, using an optimization model, a co-location score associated with the first module and the second module based on the rate of communication, the first utilization and the second utilization,
      wherein the co-location score is indicative of whether co-location of the first module and the second module is optimal for the operation according to the optimization model, and
      wherein the co-location score is determined based on at least one of: the first utilization satisfying the first utilization threshold, or the second utilization satisfying the second utilization threshold;
    determine that the co-location score indicates, according to the optimization model, that co-location of the first module and the second module is optimal for the operation; and
    perform an action associated with relocating the first module toward the second physical location or relocating the second module toward the first physical location.

2. The device of claim 1, wherein the first utilization threshold is associated with an average usage of first servers of the first server rack and a standard deviation of the usage of the first servers, and
  wherein the second utilization threshold is associated with an average usage of second servers of the first server rack and a standard deviation of the usage of the second servers.

3. The device of claim 1, wherein the rate of communication is determined based on a quantity of communications that are detected between the first module and the second module during a sliding window.

4. The device of claim 1, wherein the one or more processors, when performing the action, are configured to:
  analyze the first utilization;
  analyze the second utilization;
  select a third server associated with the second server rack to host the first module based on at least one of:
    a first difference between the first utilization and the first utilization threshold and a second difference between the first utilization and the second utilization threshold, or
    a first ratio involving the first utilization and the first utilization threshold and a second ratio involving the second utilization and the second utilization threshold; and
  relocate the first module to the third server.

5. The device of claim 1, wherein the one or more processors, when performing the action, are configured to:
  select, based on the first utilization and the second utilization, a third server associated with the second server rack to host the first module;
  cause the third server to instantiate resources to host a copy of the first module;
  route a subset of the session data associated with the operation to the copy of the first module;
  verify that the second server rack is capable of facilitating the operation of the platform based on the copy of the first module processing the subset of the session data via the third server; and
  remove, based on verifying that the second server rack is capable of facilitating the operation, the first module from the first server.

6. The device of claim 1, wherein the platform is an application platform, the first module corresponds to a first application programming interface (API) of the application platform, and the second module corresponds to a second API of the application platform.

7. The device of claim 1, wherein relocating the first module is based on at least one of:
  a first difference between the first utilization and the first utilization threshold and a second difference between the first utilization and the second utilization threshold, or
  a first ratio involving the first utilization and the first utilization threshold and a second ratio involving the second utilization and the second utilization threshold.

8. A method for dynamically managing locations of modules of a distributed host system, comprising:
  monitoring, by a device, session data associated with a first module and a second module of a platform,
    wherein the session data is associated with an operation of the platform that involves coordination between first module and the second module,
    wherein the first module is hosted on a first server of a first server rack and the second module is hosted on a second server of a second server rack, and
    wherein the monitoring the session data comprises monitoring a first utilization relative to a first utilization threshold of the first server rack and a second utilization relative to a second utilization threshold of the second server rack;
  determining, by the device, a rate of communication between the first module and the second module based on the session data;
  determining, by the device and using an optimization model, a co-location score associated with the first module and the second module based on the rate of communication, wherein the co-location score indicates an impact of co-location of the first module and the second module, and
wherein the co-location score is determined based on at least one of:
the first utilization satisfying the first utilization threshold, or
the second utilization satisfying the second utilization threshold;
determining, by the device, that the co-location score satisfies a co-location score threshold associated with an improvement to the operation;
selecting, by the device and based on the first utilization and the second utilization, the first module for relocation; and
performing, by the device, an action associated with relocating the first module to a server rack that is physically located nearer to the second server rack than the first server rack.

9. The method of claim 8, wherein monitoring the session data comprises:
receiving network flow data associated with communications between the first module and the second module;
identifying, from the communications, a first address of the first module and a second address of the second module;
generating a hash based on the first address and the second address; and
determining, during a time period and based on the hash, a quantity of a subset of the communications that are associated with the first address and the second address, wherein the rate of communication is determined based on the quantity of the subset and a length of the time period.

10. The method of claim 8, wherein determining the first utilization and the second utilization comprises:
receiving, from a first orchestration client associated with the first server rack, first status data associated with usage of servers of the first server rack;
determining, based on the first status data, the first utilization of the first server rack;
receiving, from a second orchestration client associated with the second server rack, second status data associated with usage of servers of the second server rack; and
determining, based on the second status data, the second utilization of the second server rack.

11. The method of claim 8, further comprising:
prior to determining that the co-location score satisfies the co-location score threshold, determining the co-location score threshold based on a priority of improving the operation in accordance with an optimization hierarchy of the platform.

12. The method of claim 8, wherein selecting the first module for relocation comprises:
selecting the first module for relocation based on at least one of:
a first difference between the first utilization and the first utilization threshold and a second difference between the first utilization and the second utilization threshold, or
a first ratio involving the first utilization and the first utilization threshold and a second ratio involving the second utilization and the second utilization threshold.

13. The method of claim 8, wherein performing the action comprises:
determining that the second utilization indicates that the second server rack has capacity to host the first module;
selecting, based on determining that the second utilization has the capacity to host the first module, the second server rack to host the second module; and
causing a third server of the second server rack to instantiate resources to host the first module.

14. The method of claim 8, wherein performing the action comprises:
selecting a third server of the distributed host system to host the first module based on:
the third server being on a third server rack that is nearer to the second server rack than the first server rack, and
a third utilization of the third server indicating that the third server is capable of hosting the first module;
instantiating a copy of the first module on the third server;
routing a subset of the session data associated with the operation to the copy of the first module;
verifying that the third server rack is capable of facilitating the operation of the platform based on the copy of the first module processing the subset of the session data via the third server; and
removing, based on verifying that the third server rack is capable of facilitating the operation, the first module from the first server.

15. A non-transitory computer-readable medium storing a set of instructions, the set of instructions comprising:
one or more instructions that, when executed by one or more processors of a device, cause the device to:
obtain network flow data associated with communications, via a network, between modules of an application platform that is hosted by a distributed host system;
obtain, from a first orchestration client, first rack status data associated with a first server rack,
wherein the first server rack includes a first server that is hosting a first module of an application platform;
obtain, from a second orchestration client, second rack status data associated with a second server rack,
wherein the second server rack includes a second server that is hosting a second module of the application platform;
monitor a first utilization relative to a first utilization threshold of the first server rack and a second utilization relative to a second utilization threshold of the second server rack;
determine, based on the network flow data, a rate of communication between the first module and the second module based on session data associated with a subset of the communications;
determine, using an optimization model, a co-location score associated with the first module and the second module,
wherein the co-location score indicates an impact of co-location of the first module and the second module, and
wherein the co-location score is determined based on at least one of:
whether the first utilization satisfies the first utilization threshold, or
whether the second utilization satisfying the second utilization threshold;
determine, based on the co-location score, that the first module is to be relocated from the first server rack, wherein the optimization model comprises a machine learning model that is trained according to historical data associated with optimizing a performance characteristic of one or more other application platforms based on historical rack statuses and historical rates of communication between modules within one or more application platforms; and perform an action associated with relocating the first module to a third server to improve the performance characteristic of the application platform, wherein the action is performed based on at least one of the first rack status data, the second rack status data, or the rate of communication.

16. The non-transitory computer-readable medium of claim 15, wherein at least one of:

the first rack status data indicates the first utilization of the first server rack and the second rack status data indicates the second utilization of the second server rack; or the first rack status data indicates first performance data of servers of the first server rack and the second rack status data indicates second performance data of servers of the second server rack.

17. The non-transitory computer-readable medium of claim 16, wherein the network flow data indicates utilization data of one or more network devices of the network, wherein the one or more instructions, that cause the device to perform the action, cause the device to:

select the third server based on the utilization data indicating that utilization of a network device that is communicatively coupled to the third server is below a utilization threshold; and cause the third server to instantiate resources to host the first module.

18. The non-transitory computer-readable medium of claim 15, wherein the machine learning model comprises a clustering model or a neural network.

19. The non-transitory computer-readable medium of claim 15, wherein the one or more instructions, that cause the device to perform the action, cause the device to:

select the third server based on the third server being on a third server rack that is located nearer to the second server rack than the first server rack;

instantiate a copy of the second module on the third server; and remove the first module from the first server.

20. The non-transitory computer-readable medium of claim 15, wherein the first module corresponds to a first application programming interface (API) of the application platform, and the second module corresponds to a second API of the application platform.

* * * * *